United States Patent [19]

Schovee

[11] Patent Number: 4,462,176
[45] Date of Patent: Jul. 31, 1984

[54] ARTICLE FOR FORMING A PICTURE FRAME

[76] Inventor: John R. Schovee, 10 Burr Oak Dr., Pittsford, N.Y. 14534

[21] Appl. No.: 487,545

[22] Filed: Apr. 22, 1983

Related U.S. Application Data

[63] Continuation-in-part of Ser. No. 193,809, Oct. 3, 1980.

[51] Int. Cl.³ .................... A47G 1/06; B32B 31/18
[52] U.S. Cl. .................... 40/154; 40/156; 40/155; 52/656; 403/401
[58] Field of Search .......... 40/152, 152.1, 152.2, 40/156, 158 R, 157, 155, 600; 52/656; 156/73.1, 73.3; 228/1 R, 1 A, 1 B, 110; 403/295, 401

[56] References Cited

U.S. PATENT DOCUMENTS

| | | | |
|---|---|---|---|
| 1,702,626 | 2/1929 | Beyrle | 40/152 |
| 1,863,995 | 6/1932 | Ponstingl | 46/25 |
| 2,083,354 | 6/1937 | Whittier | 40/152 |
| 2,161,396 | 6/1939 | Wittel | 40/152 |
| 2,255,151 | 9/1941 | Clements | 403/401 |
| 2,392,734 | 1/1946 | Haberstump | 40/152 |
| 2,581,843 | 1/1952 | Edwards | 40/156 |
| 2,589,729 | 3/1952 | Rates | 40/152 |
| 2,601,734 | 7/1952 | Couzinet | 40/156 |
| 2,695,470 | 11/1954 | Rosenburg et al. | 40/152 |
| 3,648,393 | 3/1972 | Parrilla | 40/152 |
| 3,673,674 | 7/1972 | Catulle | 403/401 |
| 4,090,799 | 5/1978 | Crotti et al. | 40/152 |
| 4,207,697 | 6/1980 | Murphy | 40/600 |
| 4,224,091 | 9/1980 | Soger | 40/152 |
| 4,261,122 | 4/1981 | Le Vine | 40/152 |
| 4,391,054 | 7/1983 | Schovee | 40/154 |

Primary Examiner—Gene Mancene
Assistant Examiner—James Hakomaki

[57] ABSTRACT

Article for forming picture frames and molding and the picture frame and molding made thereby, wherein the picture frame molding includes a fusible strip running the entire length thereof and wherein the abutting sections of molding at the corners of the frame are held together by the abutting fusible strips being fused together at the corners. The frame is preferably wood and the fusible strip is preferably a thermoplastic material that can be fused or otherwise bonded to itself by for example ultrasonic welding, gluing or other adhesive bonding. Also, the dust cover or backing for the picture is fusible to the back of the picture frame sections.

12 Claims, 5 Drawing Figures

ARTICLE FOR FORMING A PICTURE FRAME

BACKGROUND OF THE INVENTION

Cross-Reference to Related Application

This application is a continuation-in-part of application Ser. No. 193,809, filed Oct. 3, 1980.

FIELD OF THE INVENTION

This invention relates to picture framing and particularly to improved molding and articles for use in picture framing.

DESCRIPTION OF THE PRIOR ART

Generally the prior art method used to produce a picture frame from wood is to cut the molding with the proper length and with 45° mitered corners, to then hold two mating and abutting mitered ends, in contact, drill one or more holes through the abutting pieces, nail one or more nails through the holes countersink the nails, place an amount of putty in the recessed nail holes, and often times glue is also inserted between the opposing mitered surfaces. Each corner is joined in this same manner.

In attempts to overcome the problems of such prior art picture frames, a variety of solutions have been attempted such as a slot and a wedge across the mitered corners (U.S. Pat. No. 3,336,689), and an elastic band embracing the frame (U.S. Pat. No. 2,826,843). But, basically picture frames are still commercially made by the nailing method.

It is a primary object of the present invention to provide improved picture frames which are more economical, faster, easier and simpler than the prior art.

SUMMARY OF THE INVENTION

One of the purposes of the present invention is to provide a picture frame and molding comprised primarily of wood, containing a continuous strip of fusible plastic forming an inner plastic frame running the entire length of each frame section. The cross-sectional shape of the groove that said fusible strip of plastic lies in is of such a shape that said plastic strip is keyed in the groove, and specifically to provide an improved plastic strip or insert which is easily inserted into the groove.

One object of this invention, relative to the wood frame, is to provide the formation of a secure 45° mitered corner without additional drilling or use of nails. Instead, an ultrasonic fuser will fuse the mitered ends of the thermoplastic strips to secure the mitered corners.

One object is to provide frame molding which provides picture framers a method of construction for making frames, which will make picture framing more economical, faster, easier and simpler than previous methods.

Additional objects and features of this invention will appear from the following description in which the preferred embodiment is set forth in conjunction with the accompanying drawing.

One specific object of this invention is to provide an improved plastic strip or insert which is easily inserted into the groove.

DETAILED DESCRIPTION OF THE PREFERRED EMBODIMENT

Figure 1:
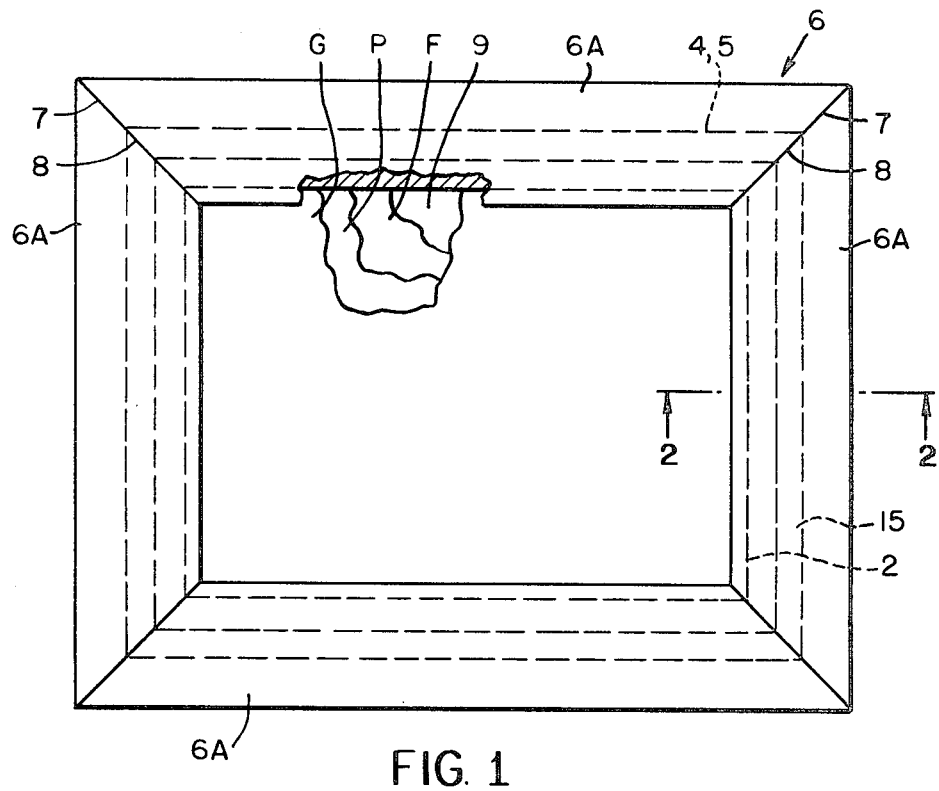
FIG. 1 is a plan view of the face of a picture frame incorporating the present invention.

The picture frame shown in FIG. 1 provides a frame 6 consisting of four frame sections or members 6A which are molding strips consisting primarily of wood molding or other suitable material and secondarily having a thermoplastic elongated strip or insert 5 incorporated therein. The thermoplastic strips 5 may be any suitable material which can be ultrasonically or otherwise fused or can be bonded by gluing to itself, for example, unsaturated polyesters, polyamides, and the like. The plastic strip 5 is keyed in a groove 4 on the back of the wood frame section 6A. The mitered corners 7, are held fast by a fused plastic joint 8 made in accordance with this invention.

In the FIG. 1 embodiment, the picture P, the glass G, and the picture filler F are prevented from moving laterally or longitudinally by the frame 6, preferably wood. Each piece of molding is rigid with respect to the other molding pieces. The frame is held rigid by the interconnected fused continuous plastic strips 5 defining a continuous plastic inner frame 15 that is keyed to the frame 6 by the groove 4 and fused at the corner joints 8. This results in a rigid picture frame without the use of nails and provides the continuous plastic inner frame 15 comprising the fused plastic strips 5 extending around and holding the adjacent frame molding sections 6A in rigid permanent relationship. It will be understood that each thermoplastic strip 5 can be any one of a number of suitable polyethers or nylons or any other composition suitable for fulfilling the requirements of this invention.

In the FIGS. 2a–d embodiment, there is a groove 2 cut out of the inside of the frame 6. The groove 2 locates and holds the glass G, the picture P and the cardboard filler F in the frame. The plastic strip 5 is keyed in the groove 4 so that the plastic strip 5 cannot be removed from the wood frame 6 after the corner joints 8 are fused. A dust cover or backing material 9 completely covers the back of the picture filler F and preferably extends across and interface with the plastic strip 5. If said dust cover 9 is of a paper material it is to be attached to the frame by tacks or glue. If said dust cover 9 is of a thermoplastic material or paper board or other suitable material which has thermoplastic material impregnated in it, then it may be fused or bonded to the thermoplastic strips 5 by means of ultrasonics or other means of applying heat sufficient to fuse or bond and join with strips 5. It is preferable to provide a thick and/or strong dust cover 9 with this invention so it will be strong enough to support the glass G, picture P and backing B in engaging relationship with the forward edge of the groove 2.

The alternative cross-sectional FIGS. 2a–d of the plastic strip(s) or insert(s) 5 which form a continuous fused strip around and securing the frame members or molding illustrates at least the four following alternative constructions detailing my improved strip or insert 5 for easy insertion into the frame members or molding 6A.

Figure 2A:
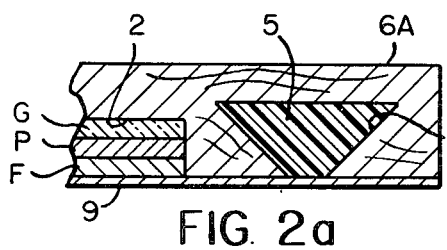
FIG. 2a is an enlarged cross-sectional view taken along the line 2—2 of FIG. 1.

The FIG. 2a embodiment shown in the parent case Ser. No. 193,809, is a single plastic strip that is trapezoidal in cross-section.

Figure 2B:
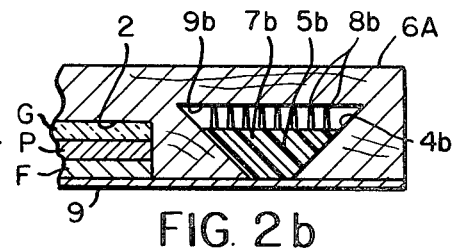
FIGS. 2b–d are enlarged cross-sectional views taken along the line 2—2 of FIG. 1 and illustrate cross-sectional views of my improved strip or insert for the frame molding.
Figure 2C:
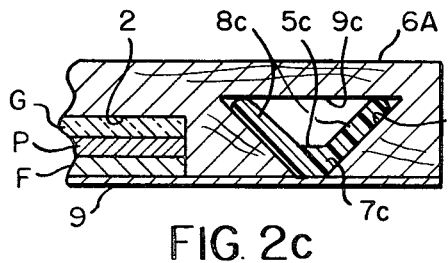
Figure 2D:
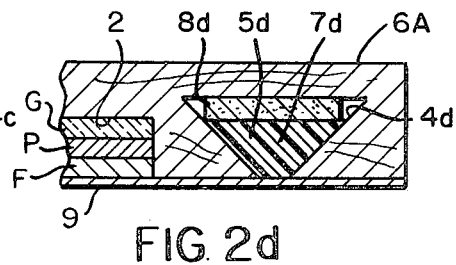

The FIGS. 2b–d illustrate my improved construction of a frame molding 6A with new embodiments of the plastic strips or inserts 5b, 5c and 5d.

The new improved plastic strips or inserts 5b, 5c and 5d each have a main body portion 7b, 7c and 7d respectively and extensions 8b, 8c and 8d are attached to the main body portions 7b, 7c and 7d respectively.

The purpose of each of these new embodiments of the plastic strips is to facilitate the insertion of the plastic strips 5b, 5c and 5d into the frame molding section 6A. In each of these three embodiments, the extensions 8b, 8c and 8d provide means for frictionally retaining the main body portions 7b, 7c and 7d in the selected position lengthwise of the groove 4 by engaging at least one surface of the groove 4. In all three embodiments 5b. 5c and 5d, the extension portions 8b, 8c and 8d frictionally engage a horizontal surface 9b opposite the opening formed by the groove 4 in the lower surface of the frame molding sections 6A.

In the FIG. 2b embodiment, the extensions 8b are a multiplicity of flexible fingers 8b molded onto the main body portion 7b. These fingers 8b will flex and increase the ease with which the plastic strip 5b may be inserted into the groove 4. It will be understood that such fingers 8b may be larger in diameter than as illustrated or they may be finer like bristles of a brush.

In the FIG. 2c embodiment, the extensions 8c are in the form of two molded legs 8c extending angularly of the main body portion 5c; and in this embodiment, the extensions 8c frictionally engage the angular sidewalls of the groove 4 as well as a horizontal surface 9c opposite the opening formed by the groove 4 in the lower surface of the frame molding sections 6A.

In the FIG. 2d embodiment, the extension 8d is in the form of a foam plastic pad 8d attached to the main body portion 5d or pre-inserted in the groove 4 prior to insertion of the main body portion 5d, in order to frictionally maintain the main body portion 5d in the selected position lengthwise of the groove 4.

Each of these FIGS. 2b, 2c and FIG. 2d embodiments of the plastic strip 5b, 5c and 5d, it will be understood that the plastic strips 5b, 5c and 5d are more easily inserted in the groove 4 than the solid strip 5 of the FIG. 2a embodiment.

In the FIGS. 3, 4 and 5 of the parent case, Ser. No. 193,809, I have described apparatus for fusing the thermal plastic strip 5 at the mitered corners 7 to form the corner joint 8. It will be understood that the same apparatus may be used with the present improved frame molding.

It will be further understood that the improved plastic strips or inserts 5b, 5c and 5d may be used as the plastic strip used in the FIG. 3A embodiment shown in the parent case Ser. No. 193,809.

The invention has been described in detail with particular reference to the preferred embodiments thereof, but it will be understood that variations and modifications can be effected within the spirit and scope of the invention as described hereinabove and as defined in the appended claims.

I claim:

1. An insert for frame molding comprising an elongated main body portion adapted to be received and retained in a groove extended along one surface of said frame molding, means between said main body portion and said groove engaging at least one surface of said groove for frictionally retaining said main body portion in a selected position in said groove.

2. An insert in accordance with claim 1 in which said means comprise a multiplicity of flexible extensions adapted for frictionally engaging at least one surface of said groove.

3. An insert in accordance with claim 1 in which said means comprises a multiplicity of flexible extensions frictionally engaging the surface of said groove opposite an opening formed by said groove along said one surface of said frame molding.

4. An insert in accordance with claim 3 in which said means comprises a multiplicity of fingers.

5. An insert in accordance with claim 4 in which said insert is key shaped in cross-section and has a width wider than the width of said opening formed by said groove in said one surface of said frame molding.

6. An insert in accordance with claim 1 in which said means comprises means frictionally engaging sidewalls of said groove.

7. Frame molding comprising a length of molding, an insert having an elongated main body adapted to be received and retained in a groove extended along one surface of said frame molding means between said main body portion and said groove engaging at least one surface of said groove for frictionally retaining said main body portion in a selected position in said groove.

8. An insert in accordance with claim 7 in which said means comprise a multiplicity of flexible extensions adapted for frictionally engaging at least one surface of said groove.

9. An insert in accordance with claim 7 in which said means comprises a multiplicity of flexible extensions frictionally engaging the surface of said groove opposite an opening formed by said groove along said one surface of said frame molding.

10. An insert in accordance with claim 9 in which said means comprises a multiplicity of fingers.

11. An insert in accordance with claim 10 in which said insert is key shaped in cross-section and has a width wider than the width of said opening formed by said groove in said one surface of said frame molding.

12. An insert in accordance with claim 7 in which said means comprises means frictionally engaging sidewalls of said groove.

* * * * *